Nov. 28, 1939.  G. D. PEET  2,181,438
HAND TRUCK
Filed Jan. 27, 1938
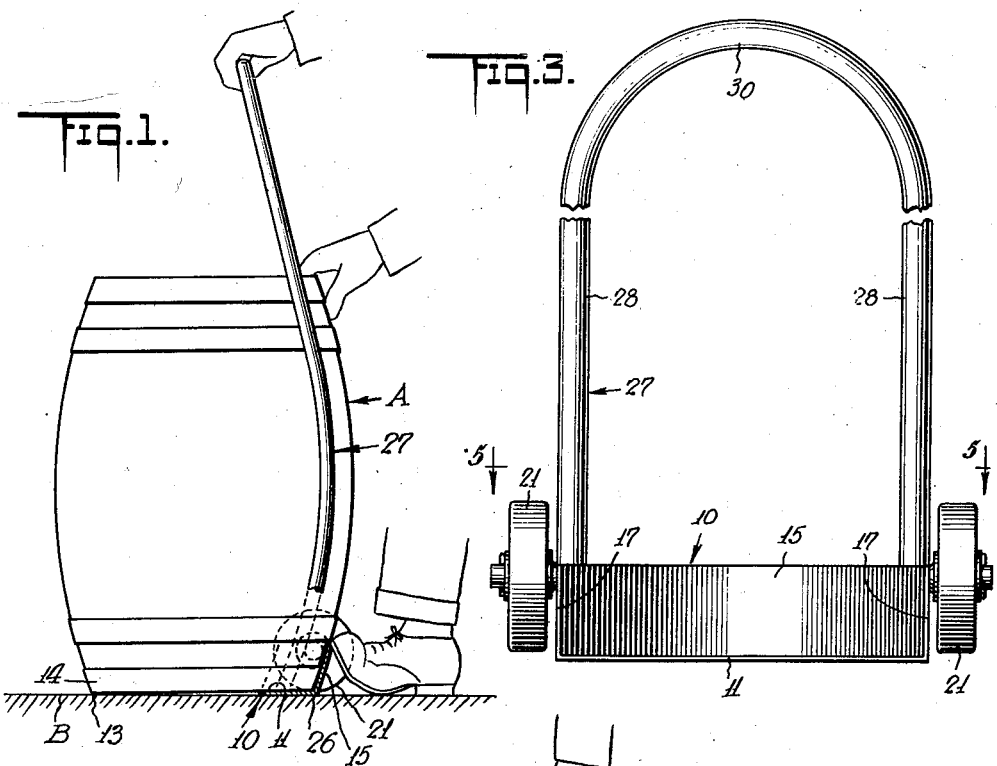
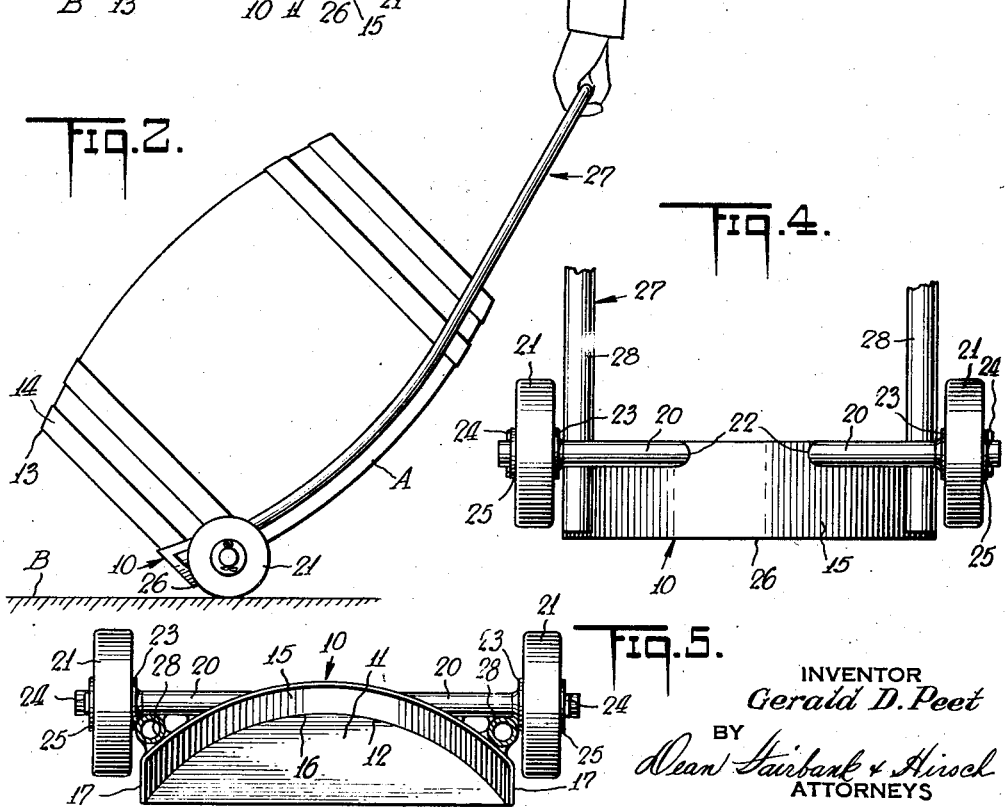
INVENTOR
Gerald D. Peet
BY
Dean Fairbank & Hirsch
ATTORNEYS Patented Nov. 28, 1939

2,181,438

UNITED STATES PATENT OFFICE 2,181,438

HAND TRUCK

Gerald D. Peet, Montclair, N. J., assignor to Novadel-Agene Corporation, Belleville, N. J., a corporation of Delaware Application January 27, 1938, Serial No. 187,119

14 Claims. (Cl. 280—56)

The present invention relates to barrel trucks, and more particularly to hand trucks adapted to transport beer kegs.

One object of the invention is to provide a truck of the character described, which is small, simple, light, rugged and inexpensive to manufacture compared with heretofore conventional constructions of corresponding capacity.

Another object is to provide a barrel truck, which lends itself to easy manipulation and maneuvering with a minimum amount of manual effort during loading, wheeling and discharging operations.

Another object is to provide a barrel truck, which affords considerable stability to the supported barrel during transportation, and which readily cradles a barrel as it is loaded onto said truck.

In a desirable embodiment the truck of the invention is particularly adapted to handle standard approximately cylindrical bulging beer kegs, and comprises a concave seat connected to the lower end of the truck, and shaped to conformably receive a segmental portion of the lower end of the beer keg. Connected to this seat is an inverted U-shaped bar, affording a cross handle piece at its upper end, and parallel side pieces curved in accordance with the bulging contour of the beer keg, and serving firmly and conformably to retain the keg in position therebetween.

Various other objects, features and advantages of the invention will be apparent from the following particular description, and from an inspection of the accompanying drawing, in which is shown one of various possible embodiments of the several features of the invention.

Fig. 1 is a side elevation of the truck in the process of being loaded with a standard beer keg.

Fig. 2 is a side elevation of the loaded truck during wheeling.

Fig. 3 is a front elevation of the truck.

Fig. 4 is a rear elevation of the lower part of the truck, and

Fig. 5 is a transverse section taken on line 5—5 of Fig. 3.

Referring now to the drawing, the improved truck comprises a concave seat 10 in the form of an angle piece, at the lower end of the truck, adapted snugly to engage the lower rear section of keg A. This seat 10 comprises a forward lip in the form of a flat segmental metal plate 11, having a peripheral arc 12 substantially conforming with the circumference 13 of the lower edge of the keg chime 14, and a curved metal plate 15, extending upwardly from plate 11 and welded thereto along abutting curved edges 16. This plate 15 extends at an obtuse angle with respect to plate 11 as shown in Fig. 1 to conform with the angularity between the chime 14 and the transverse end plane of the keg, and has side edges 17, which lie in a plane with the forward edge of said plate 11, and which are inclined slightly rearwardly with respect to said plate, readily to receive the lower rear segmental section of the keg therebetween.

The seat 10 has a pair of outwardly extending axially aligned axle rods 20, the outer ends of which rotatably support wheels 21 close to the outer sides of the said seat, and the inner ends 22 of which are cut at an angle to conform approximately with the outer periphery of the curved plate 15, and are directly welded thereto. Wheels 21 are preferably made of hard vulcanized rubber, and are retained against axial displacement on their respective axle rods 20 by collars 23 welded or otherwise secured to said rods on the inner sides of said wheels, and cotter pins 24 on the outer sides of said wheels bearing against washers 25.

Axle rods 20 are disposed slightly forwardly of the rear of seat 10 so as to bring the axes of wheels 21 almost directly above the rearmost point 26 of said seat, in the upright position of the truck shown in Fig. 1, and extend sufficiently above the bottom of the plate 11 so that the lower peripheries of the wheels extend a short distance above said bottom in the upright position of the truck shown in Fig. 1. The spacing of wheels 21 is sufficient to assure the stability of the truck without taking up any more width than the keg itself.

Extending upwardly from seat 10 is an inverted U-shaped bar 27, of hollow tubular rather than solid stock, to secure lightness of weight without sacrifice of strength. The bar 27 includes a pair of parallel side members 28, connected at their upper ends by a cross handle piece 30 which may be curved as shown. The lower ends of bar 27 extend snugly between and are directly welded to axle rods 20 and plate 15. Axle rods 20 thus not only serve as supports for wheels 21, but cooperate with the lower ends of bar 27 to brace plate 15 against deformation, and to form a strong rigid structure at the bottom of the truck. The side members 28 are curved lengthwise thereof in conformity with the bulging curvature of the beer keg.

The center of gravity of the truck is on a line passing through and at right angles to lip 10, so that said truck can stand up alone without any load thereon with said lip flatly resting on the floor B in which position the wheels 21 will extend above and out of contact with the floor.

In loading my improved truck the keg need be tilted forward but one-fourth inch to permit the lip or plate 11 to be slipped underneath the bottom of said keg into the position shown in Fig. 1. In order to tilt the loaded truck into wheeling position, the foot is buttressed against the rear of plate 15, and the truck tilted back by pulling on the handle 30 and holding onto the upper end of the keg as shown in Fig. 1 until the weight of the loaded truck is shifted onto wheels 21. The rear edge of the seat 16 serves as a reliably fixed fulcrum in this tilting action, as distinguished from conventional hand trucks in which the wheels alone must serve as fulcrums. I have found that with my improved truck and with a standard full half-keg weighing 210 pounds loaded thereon, it required only about 45 pounds pulling force on handle 30 to tilt it into wheel supporting position. Since the lower peripheral edges of wheels 21 are disposed closely behind the rear pivoting corner 26 of seat 10, the truck will be tilted but a very small angular distance before the full weight of the load truck rests on said wheels.

Assuming that the keg is not centered on the truck, in the position shown in Fig. 1, then as the truck is tilted back, said keg will be automatically cradled into centered position between the side pieces 28, so that the keg will be retained in stable equilibrium in conformable engagement with seat 10 and side pieces 28.

In rolling the loaded truck along the floor, the center of gravity of the keg will be comparatively close to the floor, since the axis of said keg extends approximately 45° therewith as shown in Fig. 2, so that if an obstruction is encountered during this rolling movement, the keg will not be thrown forwardly of the truck.

To discharge the keg from the truck, all that is necessary is to bring the truck in upright position, lift the keg slightly at its rear corner and wriggle the truck to free lip 11 from underneath the said keg.

A truck made in accordance with the present invention and weighing only 12½ pounds will effectively handle a full beer keg weighing 210 pounds. It is not only simple, light, rugged, durable and inexpensive to manufacture, but occupies a minimum amount of space so that it can be easily and inconspicuously stored in a restricted space. It can, for instance, be supported and stored close against a wall when not in use, and if desired, can be held against accidental slippage in this position by a hook on said wall engaging the cross piece 30. Furthermore, it can be wheeled either by a pushing action or a pulling action with equal facility.

The side bar sections 28 being curved rearwardly as a cradle for the keg, it is easy to lay the truck on the floor when desired with the keg lying on its side. In that position, the handle bar 30 is spaced above the floor and, therefore, may readily be gripped for resumption of wheeling of the load.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. A truck adapted to handle a bulging barrel including a pair of supporting wheels, a forward lip near said wheels adapted to support the lower end of the barrel, and a pair of side members extending upwardly from said lip for receiving the barrel therebetween, and curved to conform with the bulging contour of said barrel.

2. A hand truck adapted to handle a bulging barrel including a pair of supporting wheels, a concave seat near said wheels adapted to support the lower rear segmental section of the barrel, and a pair of side members extending upwardly from said seat for receiving the barrel therebetween, and curved to conform with the bulging contour of said barrel.

3. A hand truck adapted to handle a bulging barrel including a pair of supporting wheels, an angle piece between said wheels conforming with the contour of the lower rear segmental section of the barrel to snugly receive said section, and a pair of side members extending upwardly from said angle piece for receiving the barrel therebetween, and curved to conform with the bulging contour of said barrel.

4. A hand truck adapted to handle a barrel including a pair of supporting wheels, a forward lip between said wheels serving as a seat for the lower end of the barrel, and an inverted U-shaped bar extending upwardly from said lip, and affording a pair of side pieces curved to conform with the bulging contour of said barrel, and a cross piece at the upper end serving as a handle, the axes of said wheels being almost directly above the rearmost corner point of said seat in the upstanding position of said truck.

5. A hand truck adapted to handle a bulging barrel including a pair of supporting wheels, a forward lip between said wheels adapted to support the lower end of the barrel, and an inverted U-shaped bar extending upwardly from said lip, and affording a pair of side pieces for receiving the barrel therebetween, and a cross piece at its upper end serving as a handle, said side pieces being curved to conform with the bulging contour of said barrel.

6. A hand truck adapted to handle a bulging barrel including a pair of supporting wheels, an obtuse angle piece between said wheels conforming with the contour of the lower rear section of the barrel to snugly receive said section, and an inverted U-shaped bar extending upwardly from said angle piece and affording a pair of side pieces for receiving the barrel therebetween and a cross piece at its upper end serving as a handle, said side pieces being curved to conform with the bulging contour of said barrel.

7. A hand truck adapted to handle a barrel including a concave seat adapted to engage the lower rear segmental section of the barrel, a pair of outwardly extending axially aligned axle rods having their inner ends welded directly to said concave seat, a pair of supporting wheels near the outer ends of said rods respectively, and a pair of side members having their lower ends welded directly between said seat and said axle rods, extending upwardly from said seat and curved to conform with the bulging contour of the barrel.

8. A hand truck adapted to handle a bulging barrel including a concave seat shaped to conformably engage the lower rear segmental section of the barrel, a pair of supporting wheels, axle means for supporting said wheels, and an inverted U-shaped bar, having its lower ends extending between, and welded to said seat and said axle means, and affording a pair of curved side pieces for conformably receiving the barrel therebetween.

9. A hand truck adapted to handle a bulging barrel and comprising a pair of supporting wheels, a seat including a segmental plate and a curved plate extending upwardly therefrom at an obtuse angle and forming therewith an angle piece conforming in contour with a segmental end section of the barrel, and an inverted U-shaped bar having its lower ends fixed directly to the rear of said curved plate, said bar affording side pieces curved to conform with the contour of the barrel and adapted to firmly receive the keg therebetween.

10. A hand truck adapted to handle a bulging barrel and comprising a barrel seat including a segmental plate and a curved plate extending upwardly therefrom at an obtuse angle and forming therewith an angle piece conforming in contour with a segmental end section of the barrel, a pair of outwardly extending axially aligned axle rods having their inner ends welded to the outer side of said curved plate, a pair of truck supporting wheels journalled onto the outer ends of said rods and an inverted U-shaped bar having its lower ends extending between and welded to the outer side of said curved plate and to said rods, and affording side pieces for receiving said barrel therebetween, and curved to conform with the bulging contour of the barrel.

11. A hand truck adapted to handle a bulging barrel including a pair of supporting wheels, a flat forward lip near said wheels adapted to support the lower end of the barrel and a pair of side members extending upwardly from said lip for receiving the barrel therebetween and curved to conform with the bulging contour of said barrel, the center of gravity of said truck being on a line passing through and at right angle to said lip.

12. A truck adapted to handle a bulging barrel including a pair of supporting wheels, an obtuse angle piece between said wheels conforming with the contour of the lower rear section of the barrel to receive snugly said section and including a flat forward lip adapted to engage the lower end of the barrel, and an inverted U-shaped bar extending upwardly from said angle piece and affording a pair of side pieces for receiving the barrel therebetween, and a cross piece at its upper end serving as a handle, said side pieces being curved to conform with the bulging contour of said barrel, the center of gravity of said truck being directly above said lip in the upstanding position of said truck.

13. A truck adapted to handle a barrel including a pair of supporting wheels, and a flat forward lip near said wheels adapted to support the lower end of the barrel, and a pair of side members extending upwardly from said lip for receiving the barrel therebetween and curved to conform with the bulging contour of said barrel, said wheels being so positioned with respect to said lip and of such diameter, that the lower peripheries thereof will extend a short distance above the lower surface of said lip in the upstanding position of the truck, whereby the rearmost section of said lip will serve as a pivoting point for said truck in the angular movement of said truck from said upstanding position to a position in which the truck rests on said wheels.

14. A truck adapted to handle a bulging barrel including a pair of supporting wheels, a flat forward lip near said wheels adapted to support the lower end of the barrel, said wheels being so positioned with respect to said lip and being of such diameter, that the lower peripheries thereof extend a short distance above the bottom surface of said lip in the upstanding position of the truck, and a pair of side members extending upwardly from said lip for receiving the barrel therebetween and curved to conform with the bulging contour of said barrel.

GERALD D. PEET.